US007328088B2

(12) United States Patent
Kim et al.

(10) Patent No.: US 7,328,088 B2
(45) Date of Patent: Feb. 5, 2008

(54) METHOD AND APPARATUS FOR DETECTING POSITION OF MOBILE ROBOT

(75) Inventors: Se-Wan Kim, Seoul (KR); Sung-Il Park, Anyang (KR)

(73) Assignee: LG Electronics Inc., Seoul (KR)

( * ) Notice: Subject to any disclaimer, the term of this patent is extended or adjusted under 35 U.S.C. 154(b) by 638 days.

(21) Appl. No.: 10/743,493

(22) Filed: Dec. 23, 2003

(65) Prior Publication Data
US 2005/0021179 A1    Jan. 27, 2005

(30) Foreign Application Priority Data
Jul. 23, 2003    (KR) ............... 10-2003-0050725

(51) Int. Cl.
G05B 15/00    (2006.01)
(52) U.S. Cl. ...................... 700/259; 700/245
(58) Field of Classification Search ............... 700/245, 700/259
See application file for complete search history.

(56) References Cited

U.S. PATENT DOCUMENTS

| 5,191,328 | A | * | 3/1993 | Nelson ............ 340/870.06 |
| 5,440,216 | A | | 8/1995 | Kim |
| 5,491,670 | A | | 2/1996 | Weber |
| 5,646,494 | A | | 7/1997 | Han |
| 5,652,593 | A | | 7/1997 | Rench et al. |
| 5,940,346 | A | | 8/1999 | Sadowsky et al. |
| 6,769,709 | B1 | * | 8/2004 | Piper et al. ............ 280/477 |

FOREIGN PATENT DOCUMENTS

| DE | 40 36 022 A1 | 5/1992 |
| DE | 195 20 532 C2 | 1/1996 |
| EP | 0 766 098 A1 | 4/1997 |
| JP | 60-213877 | 10/1985 |
| JP | 2-102477 | 4/1990 |
| JP | 04-210704 A | 7/1992 |
| JP | 07-20223 | 1/1995 |

(Continued)

OTHER PUBLICATIONS

M. Vossiek et al.; "An Ultrasonic Multielement Sensor System for Position Invariant Object Indentification"; 1994 Ultrasonics Symposium; IEEE; pp. 1293-1297.

(Continued)

Primary Examiner—Thomas Black
Assistant Examiner—Marie A Weiskopf
(74) Attorney, Agent, or Firm—Birch, Stewart, Kolasch & Birch, LLP

(57) ABSTRACT

A method and apparatus for detecting a position of a mobile robot are disclosed to accurately and precisely detect a position of a mobile robot on the basis of a time difference between an infrared signal and a ultrasonic signal. The infrared signal and the ultrasonic signals are received, a time difference between the received infrared signal and the ultrasonic signals, and then, a position of a mobile robot is detected on the basis of the calculated time difference value and a distance value previously stored between ultrasonic wave generators generating the ultrasonic signals.

23 Claims, 2 Drawing Sheets

FOREIGN PATENT DOCUMENTS

| | | |
|---|---|---|
| JP | 07-020223 A | 1/1995 |
| JP | 7-140241 | 6/1995 |
| JP | 10-048309 | 2/1998 |
| JP | 11-231039 | 8/1999 |
| JP | 2001-125641 A | 5/2001 |
| JP | 2002-162459 | 6/2002 |

OTHER PUBLICATIONS

A. Curran et al.; "Sensor-Based Self-Localization for Wheeled Mobile Robots"; IEEE 1993; pp. 8-13.

Saeed Shiry Ghidary et al.; "A new Home Robot Positioning System (HRPS) using IR switched mulit ultrasonic sensors"; IEEE; 1999; pp. 737-741.

* cited by examiner

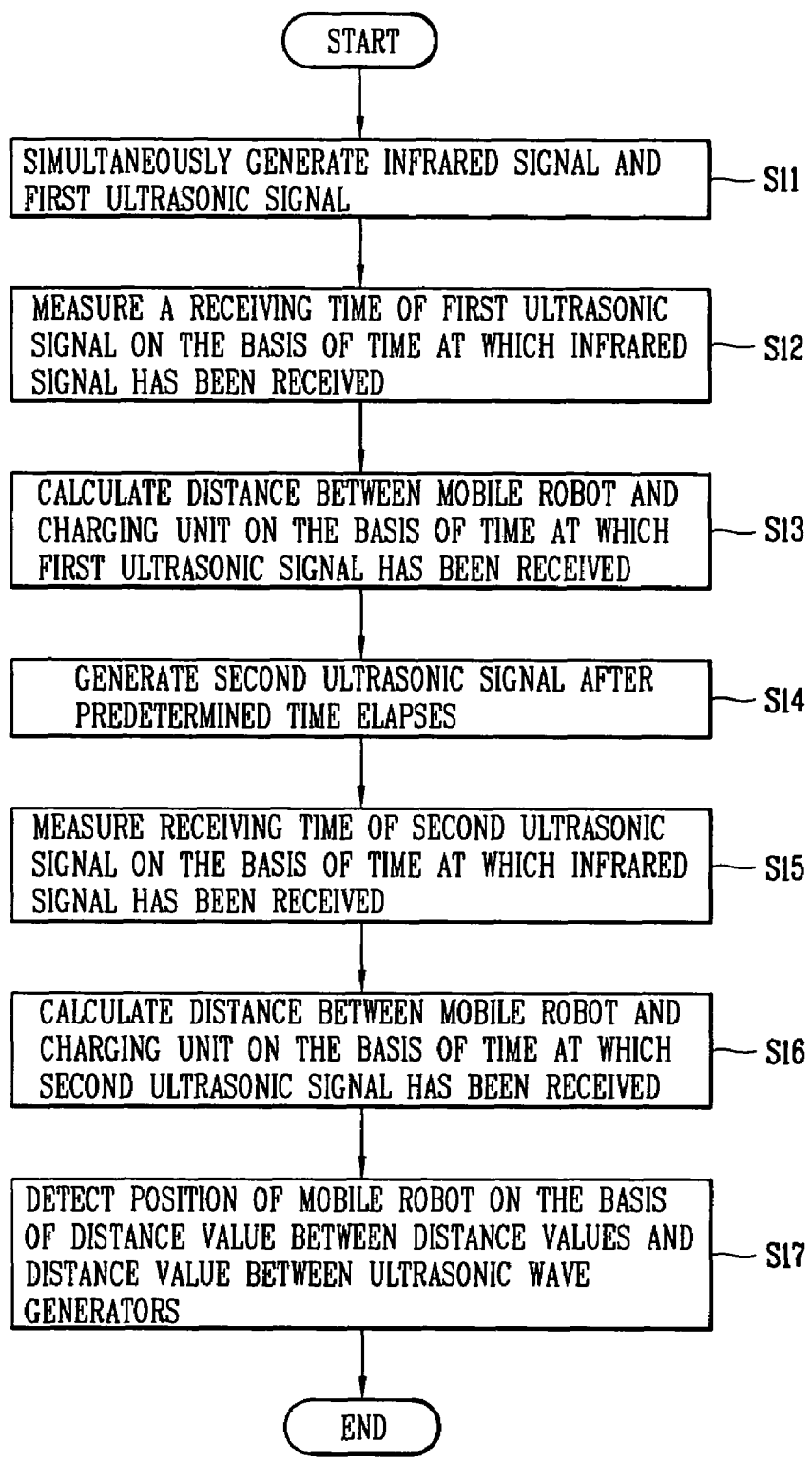

METHOD AND APPARATUS FOR DETECTING POSITION OF MOBILE ROBOT

This Nonprovisional application claims priority under 35 U.S.C. § 119(a) on Patent Application No(s). 10-2003-0050725 filed in Korea on Jul. 23, 2003, the entire contents of which are hereby incorporated by reference.

BACKGROUND OF THE INVENTION

1. Field of the Invention

The present invention relates to a mobile robot, and more particularly, to a method and apparatus for detecting a position of a mobile robot.

2. Description of the Background Art

In general, a mobile robot is a device for automatically cleaning an area by sucking dusts or foreign materials from the floor while moving along a wall of a room (i.e., a living room, the inner room, etc.) of a house even without manipulation of a user.

The robot cleaner discriminates a distance between itself and an obstacle such as an article of furniture, official supplies and a wall installed in a cleaning area through a distance sensor, and selectively drives a motor for driving its left wheel and a motor for driving its right wheel depending on the discriminated distance, whereby the robot cleaner cleans the cleaning area by turning its direction. Herein, the robot cleaner performs a cleaning operation by traveling the cleaning area through map information stored in an internal storing unit.

A mapping operation for generating the map information will now be described.

First, the robot cleaner calculates a distance between itself and a charging unit and its direction by moving along a side surface of an operation space (i.e., a wall side of a living of a house), and scans the operation space by judging its position on the basis of the calculated distance value and the direction value. At this time, the robot cleaner detects its current position by using an encoder installed at its own wheel.

The robot cleaner judges whether there is an obstacle between itself and the charging unit, and if there is no obstacle, it scans the operation space by transmitting to and receiving from the charging unit. If, however, there is an obstacle between the robot cleaner and the charging unit, the robot cleaner scans another operation space, and then, when the obstacle disappears, the robot cleaner scans the operation space without the obstacle while transmitting to and receiving the charging unit.

However, the method for detecting a position of the robot cleaner by using the encoder has a problem that an error occurs due to a sliding of the wheel or an idle rotation because the current position of the robot cleaner is searched by using the encoder installed at the wheel.

Meanwhile, in case of the method for detecting a position of the robot cleaner in accordance with another conventional art, several stickers or reflection plates having the same shape are attached at predetermined intervals at an operation region, so that the robot cleaner can recognize the sticker or the reflection plate by using a CCD camera and correct an error generated due to sliding or idle rotation of its wheel, thereby recognizing a distance between itself and the charging unit.

However, this method has a problem that if illumination brightness of the cleaning operation region changes or an object having a shape similar to the sticker or the reflection plate is recognized, the distance error is accumulated.

The techniques on the robot cleaner in accordance with the conventional art are also disclosed in U.S. Pat. Nos. 5,440,216 and 5,646,494.

SUMMARY OF THE INVENTION

Therefore, an object of the present invention is to provide a method and apparatus for detecting a position of a mobile robot capable of accurately and precisely detecting a position of a mobile robot on the basis of a time difference between an infrared signal and a ultrasonic signal.

To achieve these and other advantages and in accordance with the purpose of the present invention, as embodied and broadly described herein, there is provided a method for detecting a position of a mobile robot, including: receiving an infrared signal and a ultrasonic signal and calculating a time difference between the received infrared signal and the ultrasonic signal; and detecting a position of a mobile robot on the basis of the calculated time difference value and a distance value previously stored between ultrasonic wave generators generating ultrasonic signals.

To achieve the above object, there is also provided a method for detecting a position of a mobile robot, including: transmitting an infrared signal generated from a fixed infrared generator and a ultrasonic signal generated from a fixed ultrasonic wave generator, to a mobile robot; calculating a time difference between the transmitted infrared signal and the ultrasonic signal; calculating each distance between the mobile robot and the ultrasonic wave generators on the basis of the calculated time difference value; and detecting a position of the mobile robot on the basis of the calculated distance value and a distance value previously set between the ultrasonic wave generators.

To achieve the above object, there is also provided a method for detecting a position of a mobile robot in which a position of a mobile robot is detected by calculating a distance between the mobile robot and a charging device, including: receiving an infrared signal and a first ultrasonic signal simultaneously generated from an infrared generator and a first ultrasonic wave generator, respectively, installed at the charging device; calculating a distance between the mobile robot and the first ultrasonic wave generator on the basis of the infrared signal and the first ultrasonic signal; receiving a second ultrasonic wave generator installed at the charging device; calculating a distance between the mobile robot and the second ultrasonic wave generator on the basis of the second ultrasonic signal; and detecting a position of the mobile robot on the basis of a previously distance value between the first ultrasonic wave generator and the second ultrasonic wave generator, a distance value between the first ultrasonic wave generator and the mobile robot, and the distance value between the second ultrasonic wave generator and the mobile robot.

To achieve the above objects, there is also provided an apparatus for detecting a position of a mobile robot, wherein an infrared signal and a ultrasonic signal are received, a time difference between the received infrared signal and the ultrasonic signal, and a position of a mobile robot is detected on the basis of the calculated time difference value and a distance value between ultrasonic wave generators generating the ultrasonic signals.

To achieve the above objects, there is also provided an apparatus for detecting a position of a mobile robot in which a position of a mobile robot is detected by calculating a distance between the mobile robot and a charging device, including: an infrared signal generator installed at the charging device and generating an infrared signal; a first ultrasonic wave oscillator installed at the charging device and oscillating a first ultrasonic signal simultaneously together with the infrared signal; a second ultrasonic wave oscillator installed at the charging device and oscillating a second ultrasonic signal after the first ultrasonic signal is generated; and a position detector for calculating a time difference between the first and second ultrasonic signals on the basis of time when the infrared signal has been received, calculating a distance between the mobile robot and the first and second ultrasonic wave generators on the basis of the calculated time difference, and detecting a position of the mobile robot on the basis of the calculated distance value and a pre-set distance value between the first and second ultrasonic wave oscillators.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a flow chart of a method for detecting a position of the mobile robot in accordance with the preferred embodiment of the present invention.

DETAILED DESCRIPTION OF THE PREFERRED EMBODIMENTS

Reference will now be made in detail to the preferred embodiments of the present invention, examples of which are illustrated in the accompanying drawings.

Figure 1:
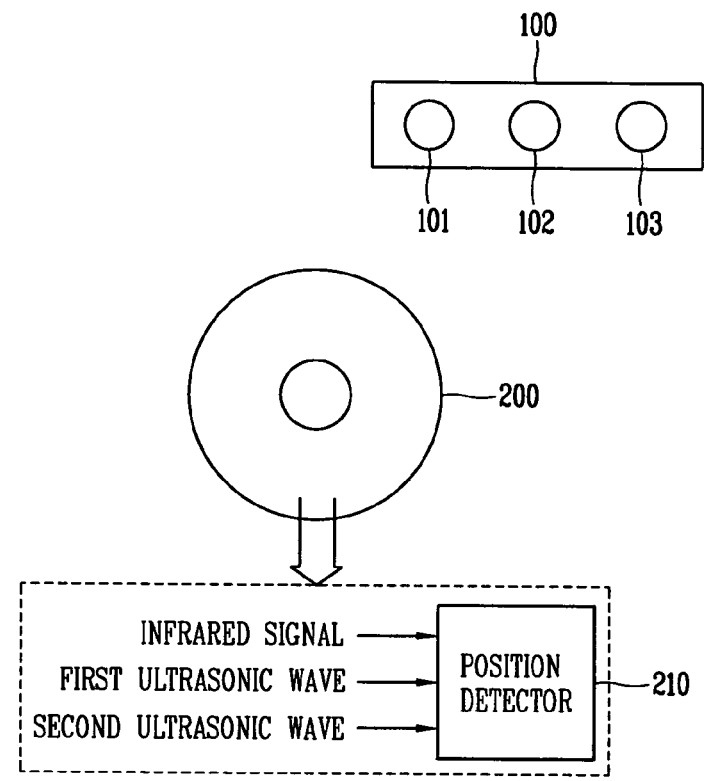
FIG. 1 is a schematic block diagram showing a construction of an apparatus for detecting a position of a mobile robot in accordance with a preferred embodiment of the present invention.
Figure 2:
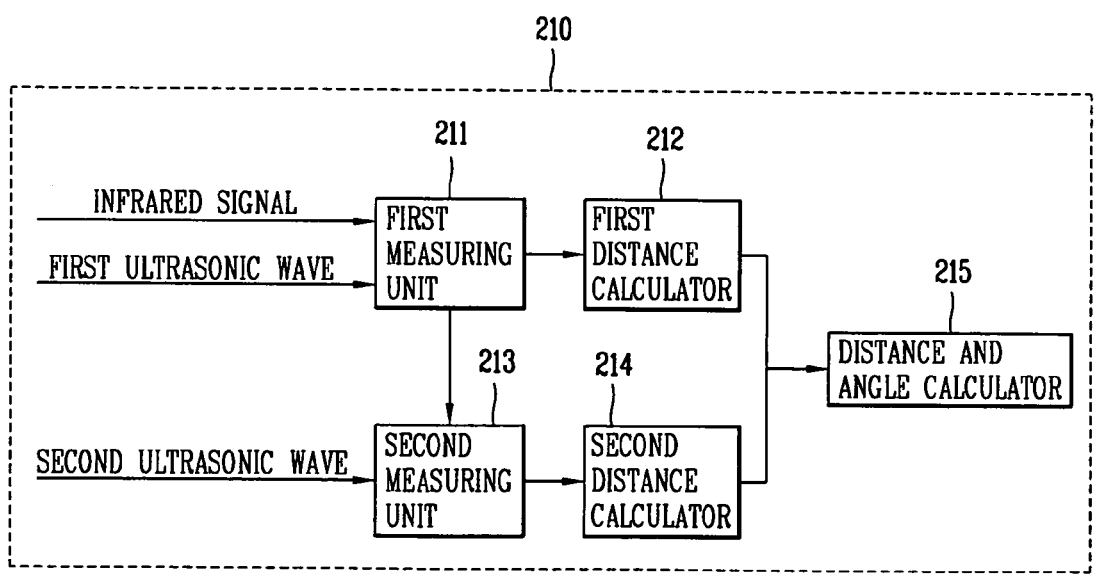
FIG. 2 is a block diagram showing a detailed construction of a position detector of FIG. 1.

A method and apparatus for detecting a position of a mobile robot, in which an infrared signal and ultrasonic signals are received and a time difference between the received infrared signal and the ultrasonic signals so that a position of a mobile robot can be accurately and precisely detected on the basis of the calculated time difference and a distance value previously stored between ultrasonic wave generators which generate the ultrasonic signals, in accordance with a preferred embodiment of the present invention with reference to FIGS. 1 to 3.

FIG. 1 is a schematic block diagram showing a construction of an apparatus for detecting a position of a mobile robot in accordance with a preferred embodiment of the present invention.

The apparatus for detecting a position of a mobile robot in accordance with the present invention can be installed in a robot cleaner or a mobile toy. That is, the present invention relates to an apparatus and method for accurately and precisely detecting a position of a robot or a toy that is movable by itself.

With reference to FIG. 1, the apparatus for detecting a position of the mobile robot 200 includes: an infrared signal generator 101 installed in a charging unit 100 for charging unit 100 charging a battery (not shown) of a mobile robot 200 and generating an infrared signal; a first ultrasonic wave oscillator 102 installed in the charging unit 100 and oscillating a first ultrasonic signal simultaneously together with the infrared signal generated from the infrared signal generator 101; a second ultrasonic wave oscillator 103 installed in the charging unit 100 and oscillating a second ultrasonic signal when a predetermined time (i.e., 0.5 seconds, which is taken for the first ultrasonic wave to be extinct) after the first ultrasonic signal is generated from the first ultrasonic wave oscillator 102; and a position detector 210 installed in the mobile robot 200 and detecting a position of the mobile robot on the basis of time differences between the infrared signal and the first and second ultrasonic signals.

Preferably, the charging unit 100 includes two or more ultrasonic wave oscillators in order to detect a distance between the mobile robot and the charging unit 100 at degrees of 180 and 360 or in a three-dimensional space.

The first and second ultrasonic wave oscillators 102 and 103 are installed at both sides of the charging unit 100, and the distance value between the first ultrasonic wave oscillator 102 and the second ultrasonic wave oscillator 103 is previously stored in the position detector 210.

A detailed construction of the position detector 210 will now be described with reference to FIG. 2.

FIG. 2 is a block diagram showing the construction of the position detector of FIG. 1.

As shown in FIG. 2, the position detector 210 includes a first measuring unit 211 for receiving the infrared signal and the first ultrasonic signal and measuring a time when the first ultrasonic signal has been received on the basis of the time point when the infrared signal has been received; a first distance calculator 212 for calculating a distance between the mobile robot 200 and the first ultrasonic wave oscillator 102 on the basis of the time measured by the first measuring unit 211; a second measuring unit 213 for measuring time when the second ultrasonic signal has been received on the basis of the time point when the infrared signal has been received; a second distance calculator 214 for calculating a distance between the mobile robot 200 and the second ultrasonic wave oscillator 103 on the basis of the time measured by the second measuring unit 213; and a distance and angle calculator 215 for calculating a distance and an angle between the mobile robot 200 and the charging unit 100 on the basis of the distance value between the first ultrasonic wave generator 102 and the second ultrasonic wave generator 103, the distance value between the first ultrasonic wave generator 102 and the mobile robot 200 and the distance value between the second ultrasonic wave generator 103 and the mobile robot 200.

The operation of the apparatus for detecting a position of the mobile robot 200 will now be described with reference to FIG. 3.

FIG. 3 is a flow chart of a method for detecting a position of a mobile robot in accordance with a preferred embodiment of the present invention.

First, the infrared signal generator 101 with the charging unit 100 installed therein generates an infrared signal when the mobile robot 200 is in a position detection mode, so that a distance between the mobile robot 200 and the charging unit 100 can be calculated. At this time, the first ultrasonic wave oscillator 102 oscillates a first ultrasonic signal when the infrared signal is generated from the infrared signal generator 101. That is, the infrared signal and the first ultrasonic signal are simultaneously generated (step S11).

The charging unit 100 can be installed at a cleaning area, for example, a living room, an inner room or on a surface of a wall of a house.

The first measuring unit 211 of the mobile robot 200 receives the infrared signal and the first ultrasonic signal, measures a time at which the first ultrasonic signal has been received on the basis of the time at which the infrared signal has been received, and outputs the measured time to the first distance calculator 212 (step S12). Herein, the infrared signal has the same speed as light, and the ultrasonic signal is 340 [m/sec].

Therefore, although the infrared signal and the ultrasonic signal are simultaneously radiated to the mobile robot 200, the infrared signal first reaches the first measuring unit 211 of the mobile robot. Because the ultrasonic signal reaches the first measuring unit 211 after the infrared signal reaches the first measuring unit 211, there occurs a time difference between the infrared signal and the ultrasonic signal.

The first distance calculator 212 calculates a distance between the first ultrasonic oscillator 102 and the mobile robot 200 on the basis of the time value measured by the first measuring unit 211. That is, the first distance calculator 212 calculates an actual distance between the first ultrasonic wave oscillator 102 and the mobile robot 200 by multiplying a sound velocity (340/msec) to the measured time value (step S13).

Thereafter, when a predetermined time elapses after the first ultrasonic wave is oscillated from the first ultrasonic wave oscillator 102, the second ultrasonic wave oscillator 103 oscillates the second ultrasonic signal. The second ultrasonic wave oscillator 103 is pre-set to oscillate the second ultrasonic signal when the predetermined time elapses after the first ultrasonic signal is oscillated from the first ultrasonic oscillator 102.

The first and second ultrasonic signals have different frequencies (step S14). Herein, in order to annihilate the first ultrasonic signal, the second ultrasonic signal is oscillated when the predetermined time elapses.

The second measuring unit 213 of the mobile robot 200 receives the second ultrasonic signal, measures a time when at which the second ultrasonic signal has been received on the basis of the infrared signal has been received, and outputs the measured time value to the second distance calculator 214. That is, the second measuring unit 213 detects the time at which the second ultrasonic signal has been received on the basis of the time point when the infrared signal has been received, subtracts the predetermined time from the detected time (that is, an oscillation interval between the first ultrasonic signal and the second ultrasonic signal), and outputs the subtracted time value to the second distance calculator 214 (step S15).

The second distance calculator 214 calculates a distance between the second ultrasonic wave oscillator 103 and the mobile robot 200 on the basis of the time value subtracted by the second measuring unit 213. Namely, the second distance calculator 214 calculates the distance between the second ultrasonic wave oscillator 103 and the mobile robot 200 by multiplying a sound velocity to the time subtracted by the second measuring unit 213, and outputs the calculated distance value to the distance and angle calculator 215 (step S16).

Thereafter, the distance and angle calculator 215 of the mobile robot 200 calculates a distance and an angle between the mobile robot 200 and the charging unit 100 (that is, the first and second ultrasonic wave oscillators) through a triangulation on the basis of the distance value between the first ultrasonic wave oscillator 102 and the mobile robot 200, the distance value between the second ultrasonic wave oscillator 103 and the mobile robot 200 and the distance value between the first ultrasonic wave oscillator 102 and the second ultrasonic wave oscillator 103. The calculated distance and angle means a current position of the mobile robot 200, and the distance value between the first ultrasonic wave oscillator 102 and the second ultrasonic wave oscillator 103 is previously stored in the distance and angle calculator 215 (step S17).

As so far described, the method and apparatus for detecting a position of a mobile robot of the present invention have the following advantages.

That is, the position of the mobile robot can be accurately and precisely detected on the basis of the time difference between the infrared signal and the ultrasonic signal. For example, when the apparatus for detecting a position is installed in a robot cleaner, the robot cleaner can accurately and precisely perform a cleaning operation on the basis of its accurately calculated position and previously stored map information and accurately move to the charging unit.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for detecting a position of a mobile robot, comprising:
   receiving an infrared signal and ultrasonic signals;
   calculating a time difference between the received infrared signal and the ultrasonic signals; and
   detecting a position of a mobile robot on the basis of the calculated time difference and a distance value previously stored between ultrasonic wave generators generating the ultrasonic signals,
   wherein in the step of calculating the time difference, respective times at which the ultrasonic signals have been received are measured on the basis of the time at which the infrared signal has been received.

2. The method of claim 1, wherein the step of detecting a position of the mobile robot comprises:
   calculating a distance between the ultrasonic wave generators and the mobile robot by multiplying a sound velocity to the calculated time difference value; and
   detecting the distance and angle between the ultrasonic wave generators and the mobile robot on the basis of the calculated distance and the distance value previously stored between the ultrasonic wave generators.

3. The method of claim 1, wherein, in the step of detecting a position of the mobile robot, the distance and angle of the mobile robot are detected through a triangulation on the basis of the calculated distance value and the distance value previously stored between the ultrasonic wave generators.

4. The method of claim 1, wherein the ultrasonic signals have different frequencies.

5. A method for detecting a position of a mobile robot, comprising:
   transmitting an infrared signal generated from a fixed infrared generator and ultrasonic signals generated from fixed ultrasonic wave generators, to a mobile robot;

calculating a time difference between the transmitted infrared signal and the ultrasonic signals;
calculating each distance between the mobile robot and the ultrasonic wave generators on the basis of the calculated time difference value; and
detecting a position of the mobile robot on the basis of the calculated distance value and a distance value previously set between the ultrasonic wave generators,
wherein in the step of calculating the time difference, the time at which the ultrasonic signals have been received is measured on the basis of the time at which the infrared signal has been received.

6. The method of claim 5, wherein the distance between the mobile robot and the ultrasonic wave generators is calculated by multiplying a sound velocity to the calculated time difference value.

7. The method of claim 5, wherein, in the step of detecting a position of the mobile robot, a distance and an angle between the ultrasonic wave generators and the mobile robot are detected on the basis of the calculated distance value and the distance value previously set between the ultrasonic wave generators.

8. The method of claim 5, wherein, in the step of detecting a position of the mobile robot, a distance and an angle between the ultrasonic wave generators and the mobile robot are detected through a triangulation on the basis of the calculated distance value and the distance value previously set between the ultrasonic wave generators.

9. The method of claim 5, wherein the ultrasonic signals have different frequencies.

10. A method for detecting a position of a mobile robot in which a position of a mobile robot is detected by calculating a distance between the mobile robot and a charging device, comprising:
receiving an infrared signal and a first ultrasonic signal simultaneously generated from an infrared generator and a first ultrasonic wave generator, respectively, installed at the charging device;
calculating a distance between the mobile robot and the first ultrasonic wave generator on the basis of the infrared signal and the first ultrasonic signal;
receiving a second ultrasonic signal generated from a second ultrasonic wave generator installed at the charging device;
calculating a distance between the mobile robot and the second ultrasonic wave generator on the basis of the second ultrasonic signal; and
detecting a position of the mobile robot on the basis of a previously set distance value between the first ultrasonic wave generator and the second ultrasonic wave generator, a distance value between the first ultrasonic wave generator and the mobile robot, and the distance value between the second ultrasonic wave generator and the mobile robot.

11. The method of claim 10, wherein the step of calculating a distance between the mobile robot and the first ultrasonic wave generator comprises:
measuring a time at which the first ultrasonic signal has been received on the basis of the time at which the infrared signal has been received; and
multiplying a sound velocity to the measured time.

12. The method of claim 10, wherein the second ultrasonic signal is oscillated when the predetermined time elapses.

13. The method of claim 12, wherein the step of calculating the distance between the mobile robot and the second ultrasonic wave generator comprises:

measuring a time at which the second ultrasonic signal has been received on the basis of the time at which the infrared signal has been received; and
subtracting the predetermined time from the time at which the second ultrasonic signal has been received.

14. The method of claim 10, wherein the first and second ultrasonic signals have difference frequencies.

15. An apparatus for detecting a position of a mobile robot, wherein an infrared signal and ultrasonic signals are received, a time difference between the received infrared signal and the ultrasonic signals, and a position of a mobile robot is detected on the basis of the calculated time difference value and a distance value between ultrasonic wave generators generating the ultrasonic signals,
wherein the apparatus comprises means for measuring a time at which the ultrasonic signals have been received on the basis of the time at which the infrared signal has been received.

16. The apparatus of claim 15, further comprising:
means for calculating a distance between the ultrasonic wave generators and the mobile robot by multiplying a sound velocity to the calculated time difference value; and
means for detecting a distance and an angle between the ultrasonic wave generators and the mobile robot on the basis of the calculated distance value and the distance value previously stored between the ultrasonic wave generators.

17. The apparatus of claim 15, further comprising:
means for detecting a distance and angle between the ultrasonic wave generators and the mobile robot through triangulation on the basis of the calculated distance value and the distance value previously stored between the ultrasonic wave generators.

18. The apparatus of claim 15, wherein the ultrasonic signals have difference frequencies.

19. An apparatus for detecting a position of a mobile robot in which a position of a mobile robot is detected by calculating a distance between the mobile robot and a charging device, comprising:
an infrared signal generator installed at the charging device and generating an infrared signal;
a first ultrasonic wave oscillator installed at the charging device and oscillating a first ultrasonic signal simultaneously together with the infrared signal;
a second ultrasonic wave oscillator installed at the charging device and oscillating a second ultrasonic signal after the first ultrasonic signal is generated; and
a position detector for calculating a time difference between the first and second ultrasonic signals on the basis of time when the infrared signal has been received, calculating a distance between the mobile robot and the first and second ultrasonic wave generators on the basis of the calculated time difference, and detecting a position of the mobile robot on the basis of the calculated distance value and a pre-set distance value between the first and second ultrasonic wave oscillators.

20. The apparatus of claim 19, wherein the position detector comprises:
a first measuring unit for receiving the infrared signal and the first ultrasonic wave signal and measuring a time at which the first ultrasonic signal has been received on the basis of the time at which the infrared signal has been received;

a first distance calculator for calculating a distance between the mobile robot and the first ultrasonic wave oscillator on the basis of the measured time by the first measuring unit;

a second measuring unit for measuring time at which the second ultrasonic signal has been received on the basis of a point when the infrared signal has been received;

a second distance calculator for calculating a distance between the mobile robot and the second ultrasonic oscillator on the basis of the time measured by the second measuring unit; and a distance and angle calculator for detecting a distance and an angle between the mobile robot and the charging unit on the basis of the distance value between the first ultrasonic wave generator and the second ultrasonic wave generator, the distance value between the first ultrasonic wave generator and the mobile robot, and the distance value between the second ultrasonic wave generator and the mobile robot.

21. The apparatus of claim 19, wherein the charging unit further includes a plurality of ultrasonic wave generators.

22. The apparatus of claim 19, wherein the first and second ultrasonic signals have different frequencies.

23. The apparatus of claim 19, wherein the second ultrasonic wave oscillator oscillates the second ultrasonic wave when a predetermined time elapses after the first ultrasonic wave is oscillated from the first ultrasonic wave oscillator.

* * * * *